United States Patent [19]

Beutler

[11] Patent Number: 5,918,812
[45] Date of Patent: *Jul. 6, 1999

[54] ROTARY SPRINKLER WITH RISER DAMPING

[75] Inventor: Matthew Grant Beutler, San Diego, Calif.

[73] Assignee: Hunter Industries Incorporated, San Marcos, Calif.

[*] Notice: This patent is subject to a terminal disclaimer.

[21] Appl. No.: 08/743,964

[22] Filed: Nov. 4, 1996

[51] Int. Cl.⁶ .................................................... B05B 15/10
[52] U.S. Cl. ......................... 239/205; 239/201; 239/203; 239/204
[58] Field of Search .................................... 267/160, 161, 267/162; 239/200, 201, 203, 204, 205, 206, DIG. 1

[56] References Cited

U.S. PATENT DOCUMENTS

| | | | |
|---|---|---|---|
| 3,051,469 | 8/1962 | Boschi | 267/33 |
| 3,684,179 | 8/1972 | Fischer et al. | 239/203 |
| 3,921,910 | 11/1975 | Hayes et al. | 239/205 |
| 4,126,216 | 11/1978 | Babcock et al. | 267/161 X |
| 4,438,908 | 3/1984 | Terada | 267/33 X |
| 5,421,565 | 6/1995 | Harkrader et al. | 267/33 X |

*Primary Examiner*—Andres Kashnikow
*Assistant Examiner*—Robin O. Evans
*Attorney, Agent, or Firm*—Michael H. Jester

[57] ABSTRACT

A sprinkler unit with riser damping comprises a tubular housing having an inlet for connecting to a source of water, a tubular riser reciprocally mounted in the tubular housing and moveable from a retracted position within the housing to an extended position from the housing, the riser having an outlet having a nozzle for distributing a stream of water outward from the housing, a passage connecting the inlet to the outlet, a retraction spring normally biasing the riser to the retracted position, and a shock absorbing ring mounted on the riser for damping movement of the riser to the extended position.

20 Claims, 2 Drawing Sheets

ROTARY SPRINKLER WITH RISER DAMPING

BACKGROUND OF THE INVENTION

The present invention relates to irrigation sprinklers and pertains particularly to an proved sprinkler riser damping means.

Irrigation as a means to provide water to plant life has been used for hundreds, if not thousands of years, and is still in wide use throughout the world today. One of the most widely used systems, particularly for lawn areas and playing or athletic fields, is the underground sprinkler system wherein a plurality of sprinkler units are positioned about a land area for distributing water over the surface of the land area. One of the most popular sprinkler units currently in use is a retractable gear driven rotary head that rotates about a generally vertical axis and covers either an arc segment or a full circle. Such units employ a water driven turbine connected through a reduction drive gear train to the sprinkler head in which a nozzle is mounted to direct a stream of water outward in an arc or circle about the rotary axis of the sprinkler unit.

Sprinkler units of this type, particularly larger units are widely used in irrigation systems used on golf courses and other turf applications. These systems are usually high pressure so that the sprinkler units are frequently subjected to extreme forces over their lifetime of use which can damage them and reduce their useful life. The most serious of these forces result from water hammer and high pressure surges that occur during system winterization and spring recharge. These high forces are especially prevalent when empty pipes are being filled with water. Slugs of water accelerate down the length of the pipe, and pops open the valve in the bottom of the sprinkler body and slams the riser including the rotor up to the end of its stroke against the top of the housing. Due to the pressures and large pipe sizes for large turf applications, these forces can be extremely high and frequently cause failure of the rotors. Attempts to solve this problem by making the sprinkler housing and parts heavier and stronger have been unsatisfactory because of increased costs. The dual medium of water and air has prevented the use of slow opening valves that use the control of the flow of the fluid from being successful. Accordingly, there is a need for simple and effective means for reducing or eliminating the above described forces to provide longer life sprinkler units.

Accordingly, there is an evident need for a sprinkler unit having means for reducing or eliminating the aforementioned forces to provide longer life sprinkler units.

SUMMARY AND OBJECTS OF THE INVENTION

Accordingly, it is a primary object of the present invention to provide a sprinkler unit having an improved riser damping or shock absorbing means for absorbing the shock of the riser impact and reducing high forces normally resulting from high velocity forces on the riser and housing.

In accordance with the primary aspect of the present invention, a sprinkler unit is provided with a yieldably damping ring for absorbing the shock of the impact of the riser in response to inlet air and water and forces generated thereby.

BRIEF DESCRIPTION OF THE DRAWINGS

The above and other objects and advantages of the present invention will become apparent from the following description when read in conjunction with the drawings wherein:

FIG. 4 is a top plan view taken of the yieldable damping ring in accordance with a preferred embodiment of the invention.

DETAILED DESCRIPTION OF A PREFERRED EMBODIMENT

Figure 1:
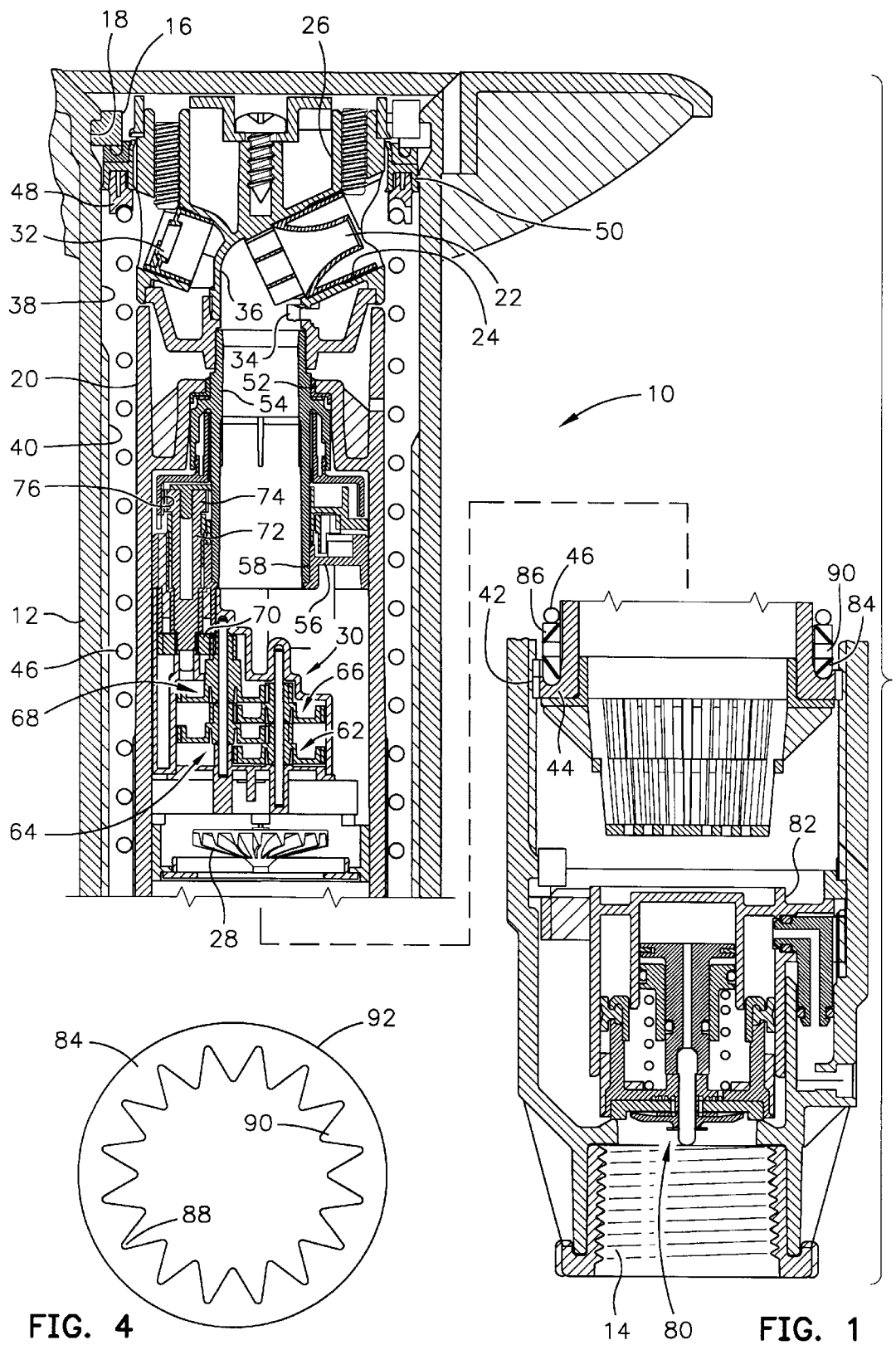
FIG. 1 is a split vertical sectional view of a sprinkler unit embodying a preferred embodiment of the invention.

Referring to the drawings, particularly to FIG. 1, there is illustrated a vertical sectional view of a sprinkler unit embodying the present invention, and designated generally by the numeral 10. The sprinkler unit comprises a generally cylindrical tubular outer housing 12, having an inlet opening 14 at one end threaded for mounting to the end of a riser or the like for connection to a source of pressurized water. An outlet end, which is normally disposed and oriented to be the top of the unit, is provided with a suitable retaining ring 16 detachably mounted therein by means of an annular recess 18 for retaining a retractably mounted inner housing or riser 20 in a suitable manner.

Figure 2:
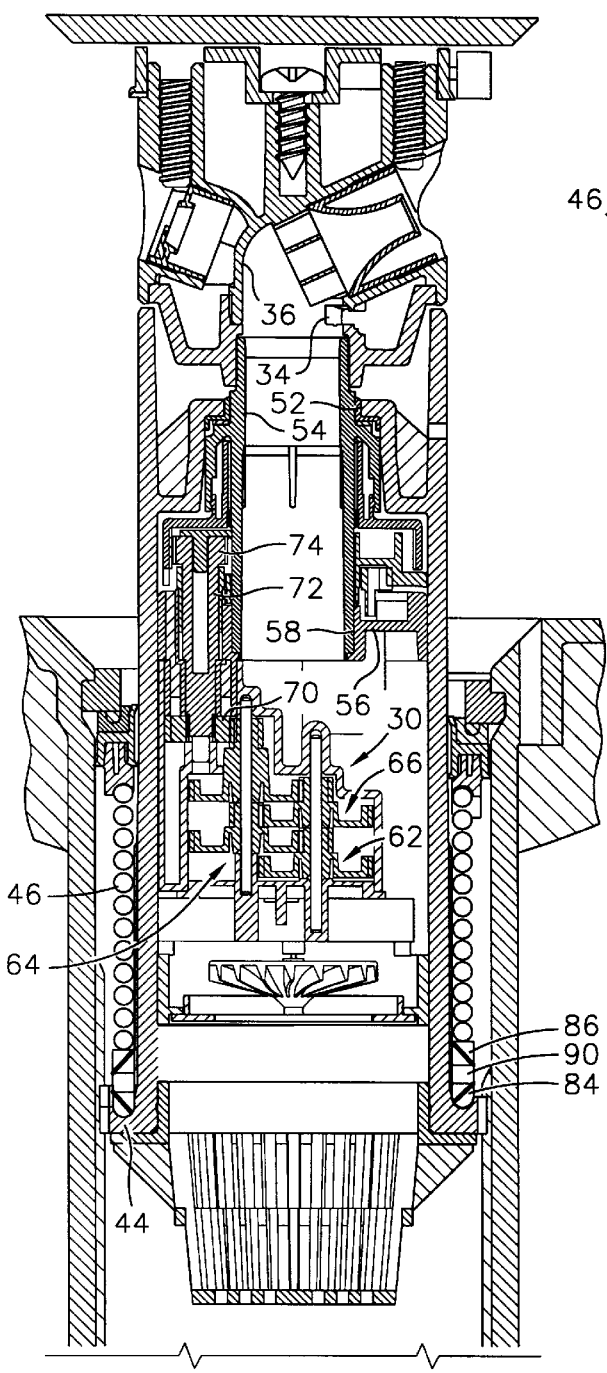
FIG. 2 is a detailed partial view of the unit of FIG. 1 showing the riser in the fully extended position.

The riser 20 is retractably mounted in the outer housing 12 for extension upward therefrom as shown in FIG. 2 and includes a nozzle 22 mounted in an upper or outer end thereof for distributing a stream of water therefrom. The nozzle is mounted in a passage or socket 24 in a rotatable head 26 and rotatably driven by means of turbine 28 through a reduction gear drive gear train designated generally at 30, as more fully described herein below. The particular unit illustrated is designed for golf course and playing field use and to rotate in a part or full circle about a central axis of the housing. A second nozzle 32 is shown mounted in the head opposite the nozzle 22 and communicates via a port 34 with a through passage 36 to improve the distribution of the stream of water closer in to the unit.

The riser or riser 20 is retractably mounted within a bore 38 of the outer housing 12, and is oriented by internal ribs 40 and by means of teeth 42 on radial flange 44 at the lower end thereof. An elongated coil compression spring 46 engages shoulder or flange 44 at the lower end of riser 20, and is confined within the bore by means of ring 16 at the upper end. Damping means in the form of a damping ring assembly comprising an yieldable or resilient ring 84 and a hard or non-elastic ring 86 are disposed between the lower end of the spring 46 and the radial flange 44 on the lower end of the riser 20. This damping ring assembly absorbs energy and reduces impact when the riser is slammed to the top of the housing by a surge of water or air. The riser 20 is normally biased to the lowermost or retracted position by spring 46, as illustrated in FIG. 1 when water pressure is shut off. The terms riser and inner housing are used interchangeably herein.

The riser 20 is provided with retracting means in the form of coil compression spring 46, which biases the riser to the retracted position (FIG. 1) when water pressure is shut off. The spring 46 is positioned between the annular flange 44 and a ring 48 at the upper end of the housing 12, which biases against outer annular seal assembly 50 retained in position by the retaining ring 16.

The riser 20 carries the rotating head 26 from its retracted position in the outer housing 12, as shown in FIG. 1, to an extended position above the ground surface as shown in FIG. 2, where the head rotates and distributes water. The riser 20 converges at the top with inwardly tapering walls to an opening 52 in which is rotatably mounted a tubular shaft 54, having an upper end extending above the upper end of housing 20 on which the rotating head 26 is mounted. The shaft 54 serves to mount the head 26 convey water from the inlet to the outlet nozzle and transfer torque from the drive train to the rotating head.

The driving assembly for rotating the head 26 is mounted in the riser 20 and includes support structure 56 having a journal 58 in which the lower end of the tubular shaft 54 is rotatably mounted. A shoulder surrounds opening 52 and is engaged by a shoulder on rotary shaft 54.

The turbine wheel 28 rotates in response to water flowing through the sprinkler unit and is mounted on a shaft which drivingly rotates a pinion gear which meshes with and drives a reduction gear unit 62 having a larger driven gear and a smaller pinion gear. The reduction gear unit 62 further drives a reduction gear unit 64 which in turn drives a reduction gear unit 66 further driving a reduction gear 68 unit. This reduction gear unit 68 is the final drive unit in the reduction drive assembly 30. This unit, as in previous embodiments, includes a larger driven gear and a smaller driving pinion.

This gear unit 68 falls at the end of the drive train for the reduction drive train for the turbine wheel 28. The gear unit 68 meshes with a gear 70 on a shaft 72 for driving a pinion 74 which in turn drives an internal ring gear 76 which is connected to and driving the tubular shaft 54.

An inlet check or flow control check valve assembly designated generally at 80 may be mounted at the inlet of the housing to aid in controlling the velocity of fluid entering the sprinkler unit. This valve assembly comprises a housing 82 which may or may not be integral with the sprinkler housing. The housing 82 is of a generally cylindrical configuration and positioned coaxially within the bore of housing 12 adjacent inlet 14.

Referring to FIG. 2, the riser 20 is shown in the fully extended position with the spring 46 in the fully compressed or bottomed position, i.e. the coils in engagement with one another which occurs when the system is pressurized. The typical spring is made of spring steel and when collapsed to coil to coil engagement is hard and unyielding. Under normal operating conditions, when the water lines are normally full and the system pressurized the riser will extend at a moderate rate to its extended position. However, when the lines are empty and being refilled, water may rush into the sprinkler unit at a high velocity forcing the riser rapidly to its extended position where the coils of the riser return spring engage one another and bottom out so that the riser abruptly stops with a high energy impact. This high impact is transmitted directly to the riser and housing and frequently damages the rotor assembly contained within the riser and/or the housing.

Figure 3:
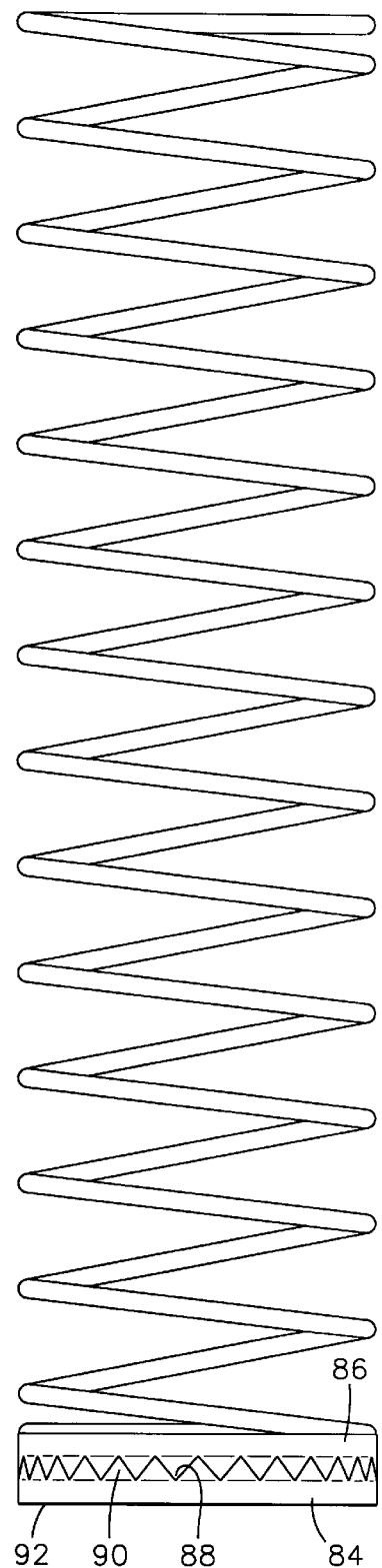
FIG. 3 is a side elevation view of the retraction spring and damping ring assembly.

The damping means in accordance with the present invention, is provided to cushion the riser when it reaches its fully extended position. A yieldable band or elastic damping ring assembly is positioned between the riser and the return spring so that the return spring 46 rests on yieldable damping ring assembly to absorb the shock of the impact when the riser bottoms out against the spring at its uppermost position. As best shown in FIG. 3, the damping ring assembly comprises a lower elastomeric ring 84 with a soft or yieldable construction and an upper non-yielding ring 86 of a harder plastic. The lower ring 84 is constructed of an elastomeric material such as a natural rubber having a hardness of about 30 to 60 durometers on the Shore A Scale. A preferred hardness has been found to be about 40 durometers on the Shore A Scale. A suitable material is available from Linatex Corporation of America, Stafford Springs, Conn. under the trademark LINATEX.

The ring 84 may be constructed to have any suitable height, but as illustrated, is constructed with a height of about four to five times the thickness. The ring 84 is constructed with a serrated or sawtooth upper surface with notches 88 forming triangular teeth 90. The teeth in the illustrated embodiment are shown to be about one-half the height of the ring, by may be any other proportion such as one quarter of three quarters. The ring 84 has a base or bottom 92 that is relatively flat or straight, and rests on the upper surface or shoulder of radial flange 44 of the riser. The teeth of the ring collapse first when the riser or spring begins to bottom out, and the resistance increases as the ring is further compressed. When the spring 46 is compressed coil to coil engagement, energy is absorbed by the yieldable damping ring assembly, rather than being transferred to the housing and riser. This provides a simple and effective device that absorbs the energy of impact, reduces stress on the rotor and housing thereby increasing its service life. While the damping ring assembly is shown at the bottom of the spring, it could also be placed at the top of the spring. The bottom is preferred since it provides less potential interference with other structures such as nozzles carried by the riser.

While we have illustrated and described our invention by means of specific embodiments, it should be understood that numerous changes and modifications may be made therein without departing from the spirit and scope of the invention as defined in the appended claims:

I claim:

1. A sprinkler unit comprising:
    a tubular housing having an inlet for connecting to a source of water;
    a tubular riser reciprocally mounted in said tubular housing and moveable by water pressure from a retracted position within said housing to an extended position from said housing, said riser having an outlet having a nozzle for distributing a stream of water outward from said housing, and a passage connecting said inlet to said outlet;
    a retraction spring normally biasing said riser to said retracted position; and
    shock absorbing means mounted on said riser for damping movement of said riser to a bottomed condition of said retraction spring.

2. A sprinkler unit according to claim 1 wherein said shock absorbing means comprises a yieldable band around said riser and positioned to yield under pressure from said riser at the end of its movement to the extended position.

3. A sprinkler unit according to claim 2 wherein said yieldable band is mounted on a lower portion of said riser below said retraction spring.

4. A sprinkler unit according to claim 3 wherein said yieldable band is formed of an elastic medium having a hardness of about 30 to 60 durometers on the Shore A Scale.

5. A sprinkler unit according to claim 4 wherein said elastic medium is a natural rubber.

6. A sprinkler unit according to claim 5 wherein said yieldable band has a serrated edge.

7. A sprinkler unit according to claim 6 wherein said yieldable band has a hardness of about 40 durometers on the Shore A Scale.

8. A sprinkler unit according to claim 1 wherein said shock absorbing means comprises a yieldable band having a serrated edge mounted on said riser and positioned to yield under pressure from said riser at the end of its movement to the extended position.

9. A sprinkler unit according to claim 8 wherein said yieldable band has a hardness of about 40 durometers on the Shore A Scale.

10. A sprinkler unit according to claim 9 wherein said yieldable band has a generally flat washer configuration prior to mounting on said riser.

11. A sprinkler unit according to claim 10 wherein said yieldable band is made of a natural rubber.

12. A sprinkler unit according to claim 11 wherein said yieldable band has a height that is about three to five times its thickness.

13. A sprinkler unit according to claim 12 wherein said serrations have a saw tooth configuration and extend about one-half the height of the band.

14. A sprinkler unit according to claim 13 wherein said yieldable band is disposed between said retraction return spring and a radial flange on a lower end of said riser.

15. A sprinkler unit according to claim 1 wherein said yieldable band is disposed between said retraction spring and a radial flange on a lower end of said riser.

16. A sprinkler unit according to claim 15 wherein further comprising a non-yieldable ring disposed between said spring and said yieldable band.

17. A sprinkler unit having riser damping, comprising:

a tubular housing having an inlet for connecting to a source of water;

a tubular riser reciprocally mounted in said tubular housing and moveable by water pressure from a retracted position within said housing to an extended position from said housing, said riser having an outlet having a nozzle for distributing a stream of water outward from said housing, and a passage connecting said inlet to said outlet;

a retraction spring normally biasing said riser to said retracted position; and a shock absorbing elastic band on said riser between said riser and said retraction spring for damping movement of said riser to a bottomed condition of said retraction spring.

18. A sprinkler unit according to claim 17 wherein said elastic band has a hardness of about 40 durometers on the Shore A Scale, and a serrated edge positioned to yield under pressure from said riser at the end of its movement to the extended position.

19. A sprinkler unit according to claim 18 wherein said yieldable band has a generally flat washer configuration with said serrated edge forming the inner diameter prior to mounting on said riser.

20. A sprinkler unit according to claim 19 wherein said serrations have a saw tooth configuration and extend about one-half the height of the band.

* * * * *